No. 703,405. Patented July 1, 1902.
W. G. GRIFFIN.
ROLLER BEARING.
(Application filed Oct. 5, 1901.)
(No Model.) 2 Sheets—Sheet 1.
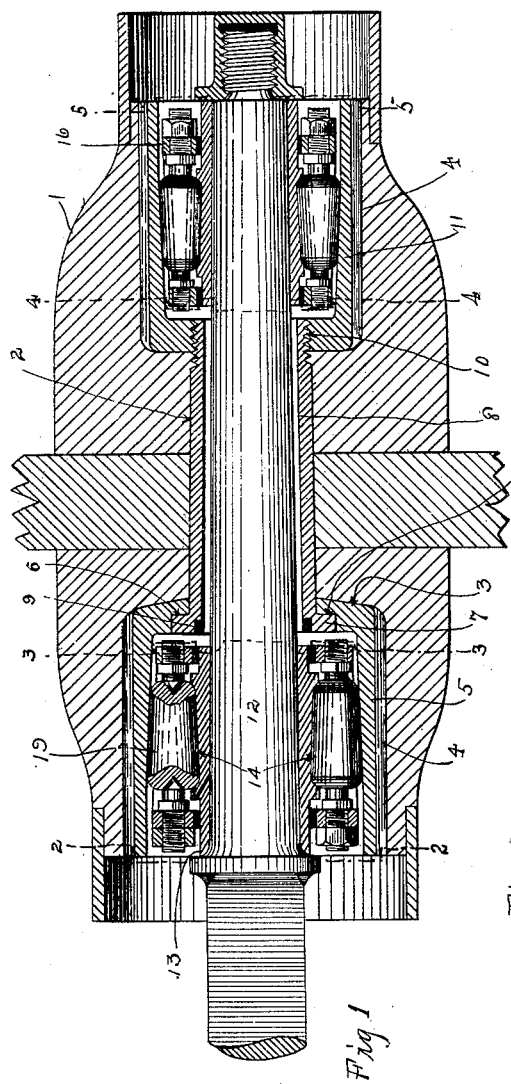
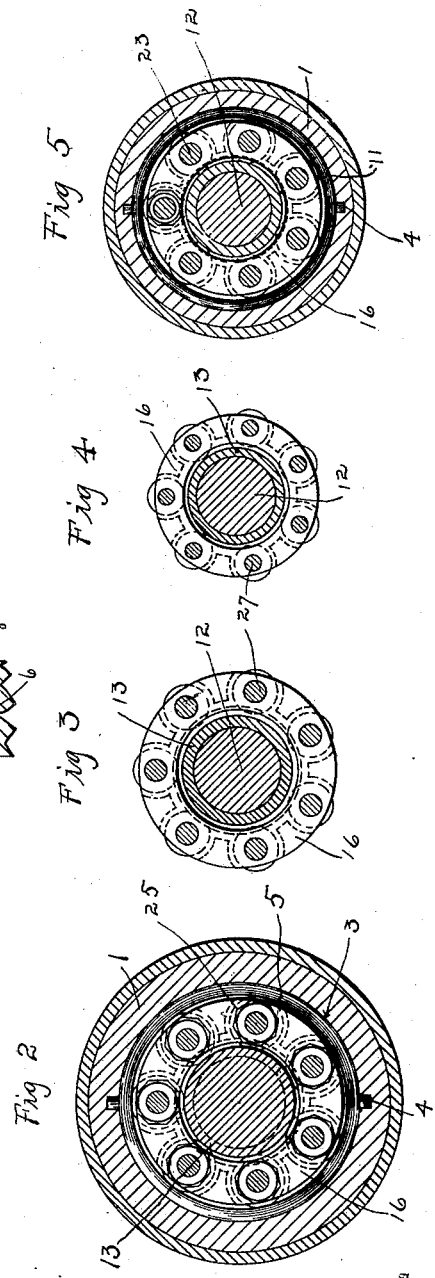
Witnesses
Grace L. Dunn
Famir C. Pitcher
Inventor
William G. Griffin
By Farrell & Lawson,
Attorneys No. 703,405. Patented July 1, 1902.
W. G. GRIFFIN.
ROLLER BEARING.
(Application filed Oct. 5, 1901.)
(No Model.) 2 Sheets—Sheet 2.

Witnesses
Grace L. Dunn
Fannie C. Ritchie

Inventor
William G. Griffin
By Farrell & Lawson
Attorneys

THE NORRIS PETERS CO., PHOTO-LITHO., WASHINGTON, D. C.

UNITED STATES PATENT OFFICE.

WILLIAM G. GRIFFIN, OF WASHINGTON, DISTRICT OF COLUMBIA.

ROLLER-BEARING.

SPECIFICATION forming part of Letters Patent No. 703,405, dated July 1, 1902.

Application filed October 5, 1901. Serial No. 77,691. (No model.)

*To all whom it may concern:*

Be it known that I, WILLIAM G. GRIFFIN, a citizen of the United States, residing at Washington, in the District of Columbia, have invented certain new and useful Improvements in Roller-Bearings, of which the following is a specification, reference being had therein to the accompanying drawings.

This invention relates to new and useful improvements in roller-bearings, and is more especially adapted for use in the hubs of vehicle-wheels. Its object is to provide a bearing of simple and durable construction which is compact in form and can be readily placed in position within the hubs of wheels of ordinary construction.

A further object is to provide casings for the bearing mechanism which are arranged at opposite ends of the hub and are adjustably connected by a barrel of peculiar construction.

Another object is to employ means for taking up end wear of the rollers independently of each other.

Other objects are to construct a bearing of few parts and to so connect or assemble the parts as to prevent them from becoming accidentally displaced and lost.

With these and other objects in view the invention consists in the novel construction and combination of parts hereinafter more fully described, and illustrated in the accompanying drawings, showing the preferred form of my invention, and in which—

Figure 6:
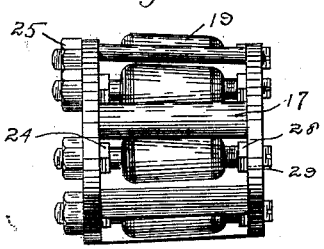
Figure 8:
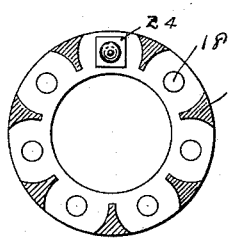
Figure 7:
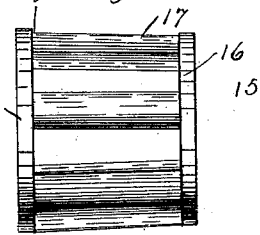
Figure 13:
Figure 12:
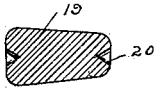
Figure 16:
Figure 17:
Figure 10:
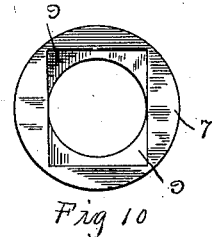
Figure 9:
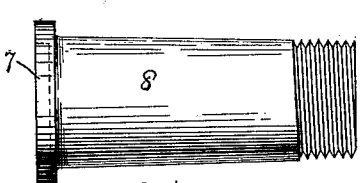
Figure 11:
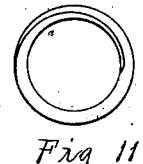
Figure 15:
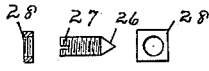
Figure 14:
Figure 18:
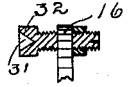

Figure 1 is a longitudinal section through a hub employing my improved bearing. Fig. 2 is a section on line 2 2, Fig. 1. Fig. 3 is a section on line 3 3, Fig. 1. Fig. 4 is a section on line 4 4, Fig. 1. Fig. 5 is a section on line 5 5, Fig. 1. Fig. 6 is a side elevation of one set of rollers and their cage. Fig. 7 is a similar view of the cage with the rollers removed therefrom. Fig. 8 is a section on line 8 8, Fig. 7, showing one of the adjustable bearings in position. Fig. 9 is a side elevation of the barrel of the hub. Figs. 10 and 11 are views of opposite ends thereof. Fig. 12 is a section through one of the rollers of the bearing. Fig. 13 is an elevation of one of the outer bearings of the rollers. Fig. 14 is a similar view showing the adjusting-nut in section. Fig. 15 is an elevation of an inner bearing for a roller, showing the adjusting-nut in section and end view. Fig. 16 is a section through a modified form of roller. Fig. 17 is a view of an outer bearing therefor; and Fig. 18 is a section through said bearing, showing it in position upon one end of the cage.

Referring to the figures by numerals of reference, 1 is a wheel-hub having a bore 2 therethrough, the ends of which are countersunk to form pockets 3. Each pocket is adapted to receive a cup having its inner wall inclined and provided upon its outer surface with a rib or projection 4, adapted to engage the wall of the pocket and prevent the cup revolving. One of the cups 5 is provided at its inner end with a circular recess 6, adapted to receive the head 7 of a metallic barrel 8, extending through the hub. This head 7 has a recess 9 therein for the reception of a suitable turning-tool, and the opposite end of the barrel is threaded to engage the threaded aperture 10, formed in the inner end of the second cup 11 of the device.

The axle 12 extends through both cups and the barrel, and mounted thereon within each cup is a sleeve 13, having an annular groove 14, which serves as a race for the rollers of the bearing.

A revoluble cage 15 is mounted in each cup and extends around the sleeve 13 therein. Each cage is formed in a single casting comprising end rings 16 and longitudinally-extending connecting-strips 17. Threaded apertures 18 are formed in each ring between the strips 17 and are adapted to receive bearing-pins for the tapered rollers 19 of the bearing.

The rollers are preferably of the form shown in Figs. 1, 6, and 12, conical recesses 20 being formed in the center of the ends. The outer bearing-pins for these rollers comprise cylindrical bodies 21, each of which has one end tapered, as at 22, so as to bear within a recess 20. A threaded stem 23 extends from the opposite end of each body 21 and receives a nut 24, which is adapted to be screwed thereon as far as the body 21. This nut normally rests against the end of the body portion, and the stem 23 is adapted to be inserted into an aperture 18 in the outer ring of the cage. A lock-nut 25 is screwed upon the end of the stem 23 and serves to clamp the ring 16 against the inner nut 24. The recess 20 in the large end of one of the rollers 19 is placed over the tapered end of the bearing-pin, and the recess in the opposite end of said roller is then adapted to receive the tapered end 26 of its inner bearing-pin. This pin is threaded from one end down to the tapered portion and is preferably grooved, as at 27, for the reception of the edge of a screw-driver. The pin is screwed through an aperture in the inner ring of the cage and through a nut 28, placed upon the inner face of said ring. The thread upon the pin may then be crushed to prevent the removal thereof, or a suitable key 29, as shown in Fig. 6, may be employed.

The rollers are all placed in position within the cage, as above described, and as the sleeve 13 is placed in position in the cage before the rollers are mounted the sleeve, cage, and rollers can all be placed upon the axle at the same time.

As the inner bearing-pins 26 cannot be removed after once placed in position in the inner rings 16 and as the outer bearing-pins cannot be screwed outward, it will be seen that loss of the rollers and the bearing-pins is prevented. Moreover, as the rollers travel in the race 14 the sleeve 13 cannot be moved except with the cage 15.

End wear upon the rollers is taken up independently. Should one roller become loose upon its bearings, it is merely necessary to unscrew the lock-nut 25, turn the stem 23 inward, and then clamp the ring 16 between the nuts 24 and 25. It will of course be understood that, if desired, the inner bearing-pins 26 may be screwed inward and locked in order to take up wear upon the inner end of the roller.

When it is desired to take up wear upon the surfaces of the rollers or upon the inner faces of the cups 5 and 11, the axle 12 should be removed and the cages taken from the cups. The barrel 8 is revolved until disengaged from the cup 11, and said cups are then slid longitudinally from their respective pockets. A washer (not shown) is then placed at the inner end of each pocket and the parts reassembled.

In lieu of employing rollers and bearing-pins of the construction hereinbefore described I may, if desired, use rollers having tapered trunnions 30. These trunnions are adapted to bear in recesses 31, formed in heads 32 of pins. The pins of this construction will be mounted in the same manner as those heretofore described. The heads 32, however, permit the inner nuts 24 and 28 to be dispensed with.

It will be seen that the cups and barrel, as well as all other parts of the device, can be readily made.

As some of the rollers of the bearing will wear faster than others, it will be seen that my adjusting devices are superior to those which are adapted to adjust the rollers in unison. Moreover, by providing means for limiting the outward movement of the bearing-pins in the rings of the cage none of the bearings can become accidentally displaced. By providing an inclined inner surface to the wall of each cup and an inclined bottom to each race 14 I am enabled to employ tapered rollers having parallel axes.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I therefore claim as new, and desire to secure by Letters Patent, is—

1. A roller-bearing comprising antifriction-rollers, a revolving cage, bearing-pins adjustably secured in opposite ends of the cage and forming bearings for the rollers, and means for preventing the removal of said pins from engagement with said rollers.

2. A roller-bearing comprising antifriction-rollers, a revolving cage formed in a single piece, a sleeve inclosed by said cage and forming a race for the rollers, bearing-pins adjustably secured in opposite ends of the cage and forming bearings for the rollers, and means for preventing the removal of the pins from the cage, whereby said rollers are locked in position within the cage.

3. A roller-bearing comprising antifriction-rollers, a revolving cage, bearing-pins adjustably secured in opposite ends of the cage, and having tapered ends projecting into recesses in the ends of the rollers and forming bearings therefor, and means for locking said pins against removal from engagement with the rollers.

4. The combination with cups having inclined inner surfaces; of a barrel adjustably connected to said cups and a bearing in each cup, said bearing comprising a sleeve, a cage formed in one piece and revolubly mounted on the sleeve, antifriction-rollers bearing upon the sleeve and cup, bearing-pins adjustably secured in opposite ends of the cage and forming bearings for the rollers, and means for locking said pins against removal from engagement with the rollers.

In testimony whereof I affix my signature in presence of two witnesses.

WILLIAM G. GRIFFIN.

Witnesses:
 HERBERT D. LAWSON,
 EMMET E. GRIFFIN.